(12) United States Patent
Voutilainen et al.

(10) Patent No.: US 7,903,642 B2
(45) Date of Patent: Mar. 8, 2011

(54) MULTI-PROCESSOR ARCHITECTURE FOR A DEVICE

(75) Inventors: Martti Kalevi Voutilainen, Espoo (FI); Kim Sandstrom, Esbo (FI)

(73) Assignee: Nokia Corporation (FI)

(*) Notice: Subject to any disclaimer, the term of this patent is extended or adjusted under 35 U.S.C. 154(b) by 445 days.

(21) Appl. No.: 11/999,314

(22) Filed: Dec. 4, 2007

(65) Prior Publication Data

US 2009/0141654 A1 Jun. 4, 2009

(51) Int. Cl.
*H04L 12/66* (2006.01)
*H04L 12/28* (2006.01)
*G06F 13/36* (2006.01)

(52) U.S. Cl. .......... 370/354; 370/401; 710/306; 710/312

(58) Field of Classification Search .................. None
See application file for complete search history.

(56) References Cited

U.S. PATENT DOCUMENTS

| | | | |
|---|---|---|---|
| 6,667,972 B1* | 12/2003 | Foltan et al. | 370/354 |
| 7,117,280 B2* | 10/2006 | Vasudevan | 710/100 |
| 7,164,904 B2* | 1/2007 | Nagy et al. | 455/403 |
| 2007/0189299 A1* | 8/2007 | Gulati et al. | 370/395.1 |
| 2007/0237076 A1* | 10/2007 | Balandin et al. | 370/229 |
| 2008/0025288 A1* | 1/2008 | Benner et al. | 370/351 |
| 2009/0122703 A1* | 5/2009 | Gangwal et al. | 370/235 |

OTHER PUBLICATIONS

Space Engineering, Space data links-Telecommand protocols, synchronization and channel coding, Nov. 14, 2007, pp. 1-139, European Cooperation for Space Standardization, Noordwijk, The Netherlands.

* cited by examiner

*Primary Examiner* — Pankaj Kumar
*Assistant Examiner* — Marcus R Smith
(74) *Attorney, Agent, or Firm* — Banner & Witcoff, Ltd.

(57) ABSTRACT

Aspects of the invention provide apparatuses and methods for composing a device with different types of multi-processor subsystems based on expected latency times and processing bandwidths. An apparatus may include multi-processor subsystems with different performance characteristics that interact with each other through bridge modules and a central packet network. Different types of multi-processor subsystems include a multi-point bus network, a circuit-switched network, a packet-switch network, and a shared block device. The apparatus includes a plurality of components, where each component has at least one multi-processor subsystem. The apparatus may be partitioned into different detachable parts, which can operate in an independent manner. The detachable parts may be joined so that the detachable parts can interact. A service in one multi-processor subsystem may interact with another service in another multi-processor subsystem by sending messages between the services.

28 Claims, 10 Drawing Sheets

US 7,903,642 B2

MULTI-PROCESSOR ARCHITECTURE FOR A DEVICE

BACKGROUND

Modern mobile devices often have multiple functionalities that cannot execute energy-efficiently on general purpose processors. As an example, a functionality may require real-time, very low latency, and high bandwidth computing for handling of graphics data in game applications. On the other hand, another functionality may support sensor data handling that typically has very long latencies without performance degradation.

Existing mobile device architectures often do not support the optimization of hardware and software for application requirements. Very simple tasks may be handled with powerful processors, while real-time, low-latency applications may be executed in a computing environment having long latencies. Connections between subsystems may not be well optimized for an application. For example, a connection-oriented interface may be used when better power efficiency could be reached by using a connection-less interface. On the other hand, a long-latency connection-less interface may be used to transmit data having very tight latency and timing jitter requirements.

Consequently, there is a real market need to provide devices, such as mobile devices, that execute efficiently for each of the intended functionalities.

SUMMARY

An aspect provides apparatuses and methods for composing a device, such as a mobile device, with different types of multi-processor subsystems based on expected latency times and processing bandwidths. Embodiments of the invention support multi-processor subsystems as well as other types of processing devices that interact with a domain, e.g., a digital sensor or a storage device.

With another aspect, an apparatus includes multi-processor subsystems with different performance characteristics. The multi-processor subsystems interact with each other through bridge modules and a central packet network. A bridge module is situated between the central packet network and each multi-processor subsystem. Different types of multi-processor subsystems (multi-processing nodes) include a multi-point bus connecting every processor, a circuit-switched network for communicating between a plurality of processors, a packet-switched network for communicating between a plurality of processors, and a shared block device that is utilized by a plurality of processors.

With another aspect, an apparatus includes a plurality of components, where each component has at least one multi-processor subsystem. The apparatus may be partitioned into different detachable parts, which can operate in an independent manner. The detachable parts may be joined so that the detachable parts can interact.

With another aspect, multi-processor subsystems may support services. A service in one multi-processor subsystem may interact with another service in another multi-processor subsystem by sending messages between the services.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
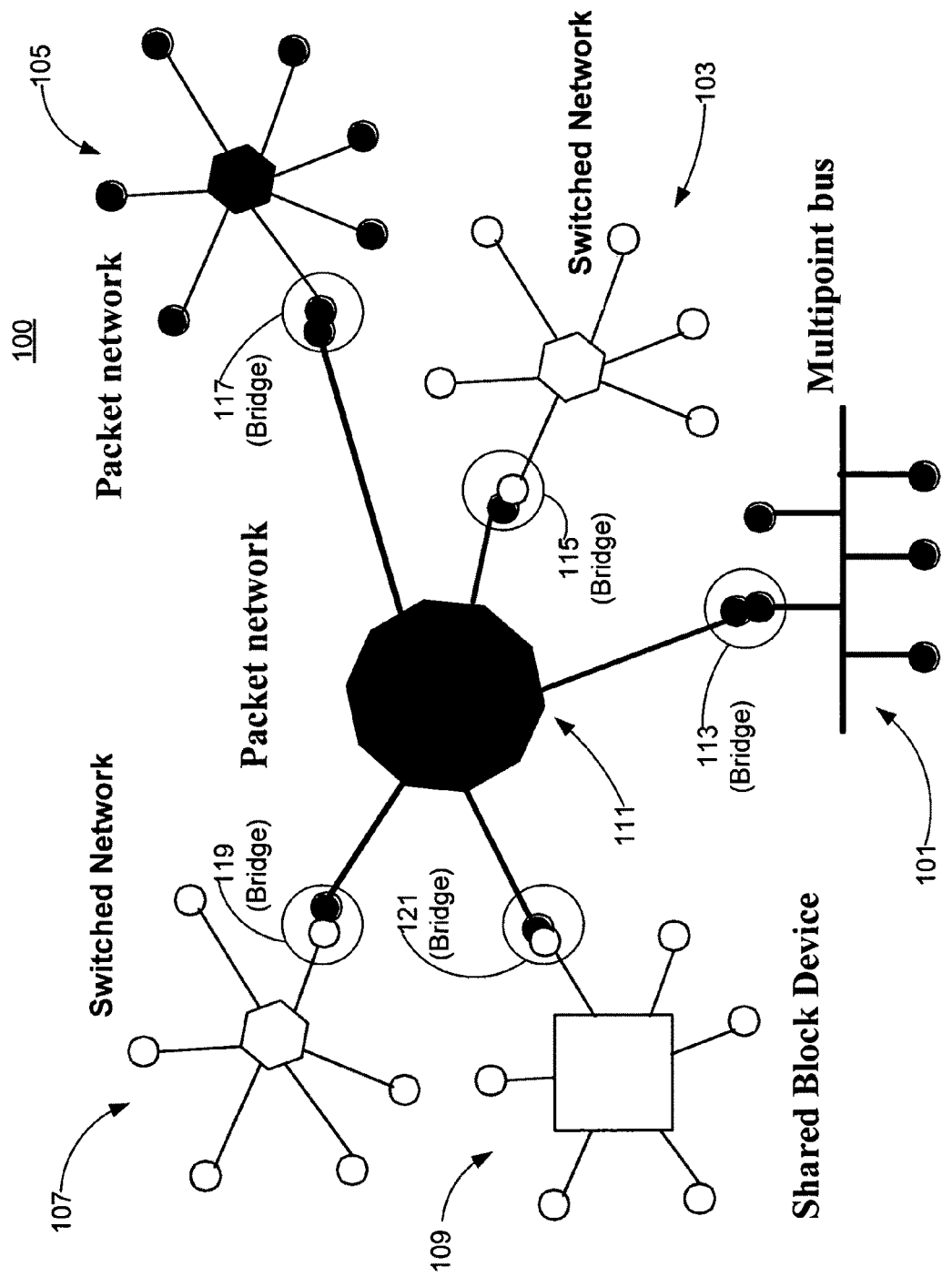
FIG. 1 shows an exemplary device having multiple multi-processor subsystems according to an embodiment of the invention.

FIG. 1 shows exemplary device 100 having multiple multi-processor subsystems 101-109 according to an embodiment of the invention. (As shown in FIG. 1, multi-processor subsystems are represented by small round circles connected by a line to the domains.) Device 100 is composed of different types of multi-processor subsystems connected by central packet network 111 supporting an interface such as Spacewire (ECSS-E50-12A) http://spacewire.esa.int/content/Standard/ECSS-E50-12A.php or Mobile Industry Processor Interface (MIPI) Alliance Universal protocol (UniPro2). UniPro2 and Spacewire are only examples of packet network protocols. Other packet network protocols (Internet for example) may be used. Central packet network (communications network) 111 is typically connection-less (i.e., data is sent from one end point to another without prior arrangement.) However, embodiments of the invention may utilize another network protocol. Each multi-processor subsystem comprises a plurality of processors, in which processors (functions, nodes) interact with each other using a bus, packet network, crossbar switch, and so forth. While the embodiment shown in FIG. 1 includes central packet network (communication network) 111, some embodiments of the invention may utilize a communication network having any number of networks, in which no particular network may be considered to be central since the networks are merely connected to each other. The connections may form a chain of networks or a network of networks.

With the embodiment shown in FIG. 1, device 100 (which may comprise a mobile device) is composed of at least four multi-processor subsystems. (A multi-processor subsystem may be generically referred as a processing node. A processing node may be implemented in different ways that may or may not utilize processors or multiprocessors.) Exemplary multi-processor subsystems include:

Multi-processor subsystem 101: A multipoint bus using time division multiplexing for multiprocessor subsystems for applications that have a small amount of data to be transmitted between processors but where connections between every processor of the multiprocessor unit is required.

Multi-processor subsystems 103 and 107: A switched network (circuit-switched) multiprocessor subsystems using very low-latency point-to-point connections through a cross-bar switch type network.

Multi-processor subsystem 105: A packet switched network multiprocessor subsystem for applications that tolerate a long latency but require very large bandwidth.

Multi-processor subsystem 109: A shared block device for multiple processors. An example of implementation is the shared use of a SDRAM or FIFO by several processors running the same operating system. (Shared memory allows two or more processes to access some common data structures by placing them in a shared memory segment. A mechanism (specifically a resource) is applied when processes need to share large amounts of data in an efficient way.) The shared block device may be used as hardware support or hardware acceleration of OS messaging (e.g., System V Interprocess Communication (IPC)). The nodes in a shared block device may be processors that do not need any other shared memory space to run as multiple cores for a single operating system. The fast shared block device supports multicore systems with shared memory for the OS memory space. With embodiments of the invention, shared space can be used only for OS messaging.

With an aspect of the invention, an apparatus (e.g., a mobile device) is partitioned into a plurality of multi-processor subsystems, in which the multi-processor systems have a different performance characteristic. Performance characteristics include latency and processing bandwidth. Performance characteristics may address the communication that the processing nodes generate, the latency at which a data package is routed, and the bandwidth that can be processed.

With the embodiment shown in FIG. 1, each of the multi-processor subsystems is connected through a bridge module, in which one side (toward packet network 111) uses a packet network protocol and hardware (e.g., Spacewire or UniPro2) and the other side (toward the multi-processor subsystem) uses a protocol and hardware specific to the associated multi-processor subsystem. (With embodiments of the invention, a bridge module directly connects two multiprocessor subsystems. As shown FIG. 1, this is illustrated as two small circles touching each other. The circles represent the multi-processor subsystems and strictly speaking the space or contact between them is the bridge.) Only one bridge module is configured with each multi-processor subsystem (bridges modules 113-121 corresponding to multi-processor subsystems 101-109, respectively). Consequently, the architecture is simplified while allowing optimized computing structures for various applications. In some embodiments, there are no other connections between multi-processor subsystems 101-109 other than through bridge modules 113-121. Multi-processor subsystems 101-109 may execute different types of operating systems. However, with embodiments of the invention, a multi-processor subsystem may be a peripheral device without processors but with enough intelligence to be able to communicate through a bridge module to central packet network 111.

However, with certain embodiments of the invention, multi-processor subsystems may be connected by multiple bridge modules to form both chains of multi-processor networks and circular looped network connections. With such a configuration, an alternative bridge protocol is typically used. The alternative protocol may include a bridge monitor search and connection path routine so that no path goes through the same bridge module twice. The routine checks that a path doesn't go through the same bridge twice and is needed only if the network is circularly looped. With embodiments of the invention, circular loops are not used, and the bridge does not need to check paths for looping. In the case of a circular looped network, if a request to establish a path is attempted by an entity that the bridge module is already providing a node search for, the bridge will refuse the execution of the request.

With an aspect of the invention, all functions/nodes that require mutual communication with very low latency and high computational bandwidth are associated with an on-chip switched network multi-processor subsystem (e.g., multi-processor subsystem 103 or 107). All functions/nodes that require high bandwidth between functions/nodes but tolerate long latency and timing jitter are collected into on-chip or off-chip packet network (packet-switched) subsystem 105 (which may utilize Spacewire or MIPI Unipro2). All functions/nodes requiring very high bandwidth mutual communication and use of the same data are collected into on-chip or off-chip (but inside the same IC package) Shared Block Device subsystem 109. Low bandwidth functions/nodes are connected by on-chip multipoint bus subsystem 101. Connections between subsystems are through central packet network 111 (using, for example, Spacewire or UniPro2). A major characteristic of the architecture shown in FIG. 1 is that every multi-processor subsystem can be optimized for an application. Communication between the multi-processor subsystems may include only changed information compared to the previous packet. Information is sent early enough to be available when needed, but without any accurate timing information. Multi-processor subsystems execute independently, sending mainly parameters to other subsystems. Computing based on received parameters is done locally.

As will be discussed with FIGS. 4 and 5, some embodiments of the invention support multi-processor subsystems or subsystem groups that may be separated into independent devices, in which one part of the device is taken to a sport activity and the other part is left home to be loaded with movies or used as a projector for television viewing.

In accordance with certain aspects of the invention, very high computing power may be provided for applications that need it. On the other hand, for applications that do not require complex functionalities, a simple logical structure for the mobile device may be used with very low power consumption. High computing power may be provided because multiple processors (shown as circles in FIG. 1) can process data in parallel and communicate over a network (switched network, packet network, multipoint bus, or shared memory block) that's optimal for the task. The network can also be divided into smaller clusters that may increase throughput. Low power and reduced-complexity configuration is possible by having each processor connected to a network type that is better suited for the processor's functionality (e.g., a simple sensor would be better suited with a multipoint bus than a packet network). Also, each network can have a load that is proportional to its capacity. While not shown in FIG. 1, there may be several networks of the same type. Communication methods may be used in such a way that accommodate application requirements into computing and interface hardware and software. However, some functionalities may need to be doubled because communication between subsystems is based on a connection-less, long-latency packet-based network (where a packet switched network (e.g., central packet network 111 as shown in FIG. 1) acts as a base connecting to other types of networks. The doubling of functionalities may be necessary because some network features may not translate into the (domain of the) packet network, in particular synchronization and other real time features.)

If the device architecture is optimized for low power, benefits may be substantial because battery operation time can be increased substantially. Applications may also provide better user experience when those applications that require high computing power are handled in multi-processor subsystems (acting as network nodes) that are optimized for that purpose.

As shown with the embodiment in FIG. 1, there is only one bridge module (e.g., bridge 115) per multi-processor subsystem (e.g., 103) to simplify logical and mechanical structures of a mobile device. The bridge module has a connection into a multi-processor subsystem (e.g., a processing node 103) according to the standard used in the subsystem. Examples of standards used in multi-processor subsystems include I2C, PCIe, USB, Institute of Electrical & Electronics Engineers (IEEE) 1394, and MIPI SlimBus™. On the packet network side (i.e., toward central packet network 111) of the bridge module, the connection is made according to the Spacewire or UniPro2 standard. The MIPI Slimbus is an example on any multipoint bus, another example is Compact-PCI.

Figure 6:
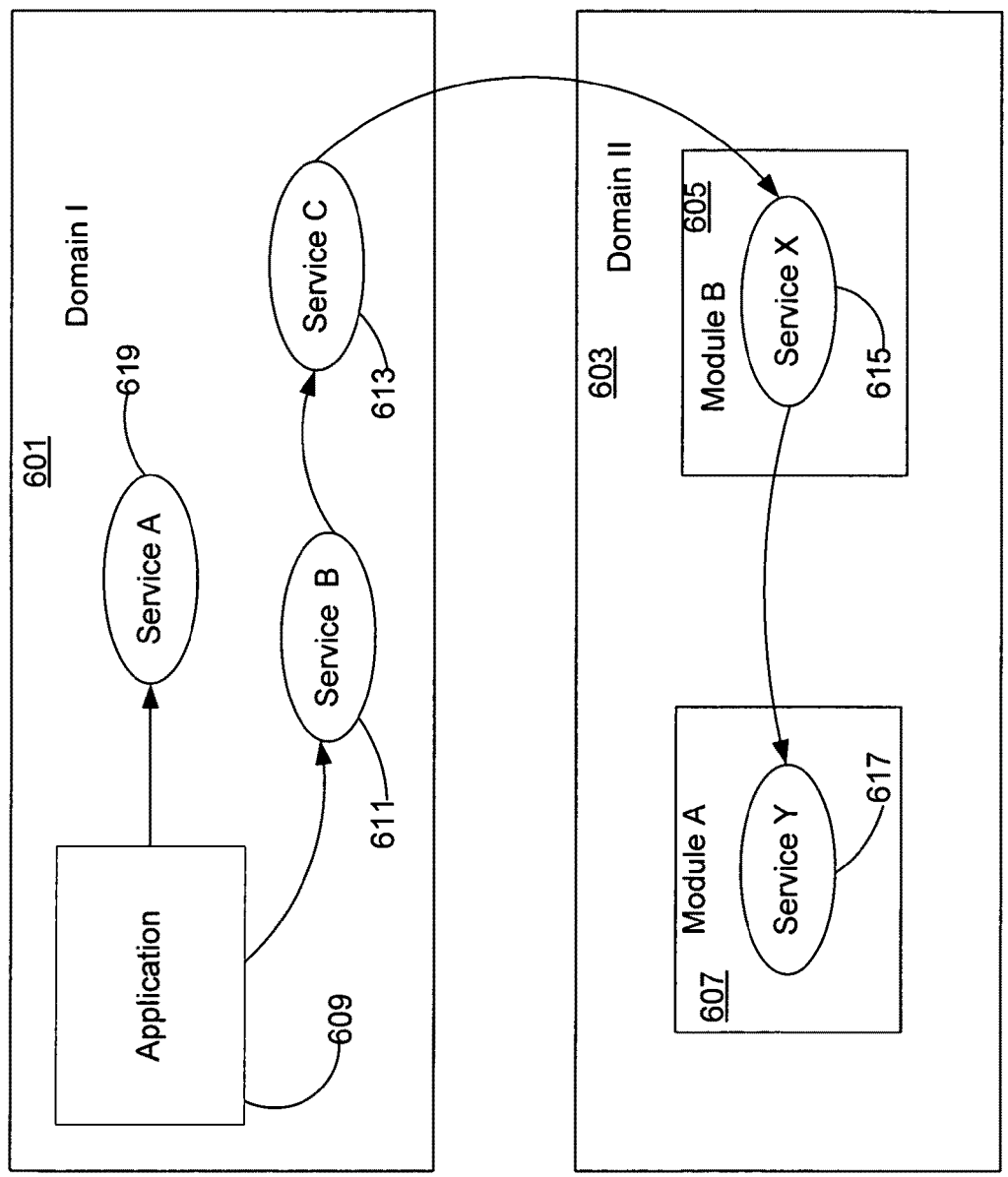
FIG. 6 shows an example of a relationship between services in two separate service domains A domain may be a network or an execution environment according to an embodiment of the invention.

Each multi-processor subsystem may provide visibility for its functionality as services (e.g., services 611-619 as shown in FIG. 6). In order to provide a universal interface to services in any network, a universal interface protocol may be used for service access. A universal protocol will be further discussed with FIG. 7.

Figure 2:
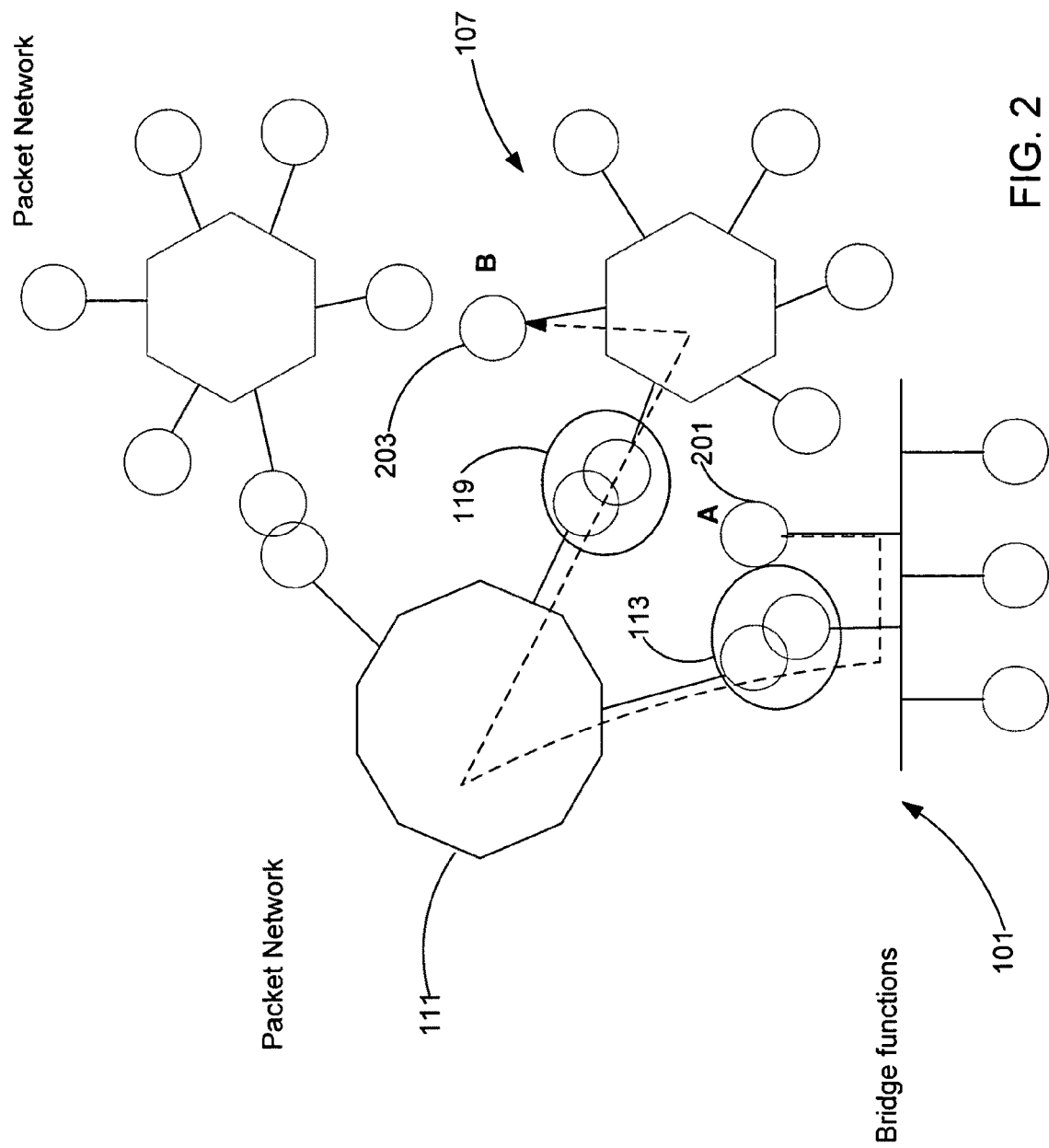
FIG. 2 shows an example of a service request from a service or application on a multi-processor subsystem to another service on another multi-processor subsystem according to an embodiment of the invention.

FIG. 2 shows an example of a service request from processor 201 of a multi-processor subsystem 101 (as shown in FIG. 1) through bridge modules 113 and 119 to processor 203 of multi-processor subsystem 107 according to an embodiment of the invention. In the scenario shown in FIG. 2, processor 201 sends a message (e.g., to invoke a service that may be provided by processor 203) over multi-point bus 101 through bridge module 113. Processor 201 utilizes the network protocol native to multi-processor subsystem 101, while bridge module 113 translates the message in accordance with the network protocol supported by central packet network 111. Central packet network 111 delivers corresponding packet(s) to bridge module 119 (which translates the packet(s) to the message in accordance with the network protocol supported by switched network 107) in order to forward the message to switched network 107. Switched network 107 in turn delivers the message to processor 203. A return message (e.g., the response to a service request) is similarly sent from processor 203 to processor 201 through bridge module 119, central packet network 111, and bridge module 113.

Computing support functions in bridge modules 113 and 119 may perform processing such as modifying format or content of data packets, but typically bridge modules 113 and 119 provide only the service acquired from a dedicated service provider. Examples are coders and decoders of audiovisual streams. From the service requester's perspective, bridge modules 113 and 119 appear as service providers, although the actual processing may occur in a dedicated processor connected into central packet network 111.

Communication support functions ensure that the right information is available in the right place early enough. For example, the communication support functions handle synchronization of data packets. Communication support is a mechanism to exchange information between processing nodes and bridges concerning routing, data synchronization, data types, data sizes, and so forth. With embodiments of the invention, the communication support is provided by the same architectural elements as data transfer is (e.g. the network components).

Control and coordination functions (e.g., communication support) handle resource allocation of bridge modules 113 and 119 as well as services provided by the bridge modules 113, 119. Resources may include bandwidth and available time slots for computing services located either in the bridge functions module or in a dedicated module located in central packet network 111.

Figure 3:
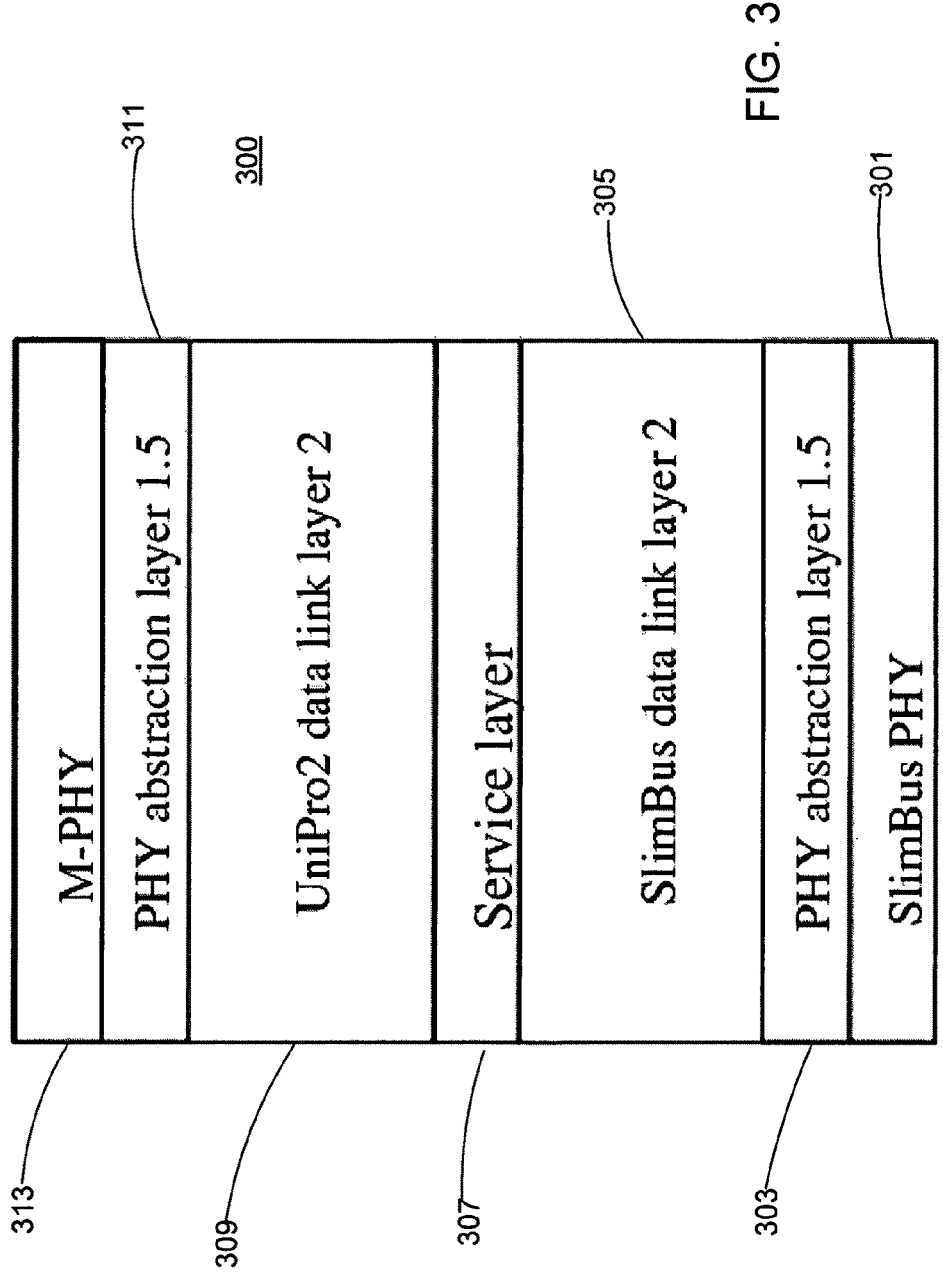
FIG. 3 shows a protocol stack for a bridge module according to an embodiment of the invention.

FIG. 3 shows a protocol stack for a bridge module according to an embodiment of the invention. A bridge module (e.g., bridge modules 113-121 as shown in FIG. 1) is typically a translational bridge that provides translation between the formats and transit principles of different media types. The bridge module handles connections from different types of multi-processor subsystems, e.g., switched network 103 and multipoint bus 101, into packet network 111.

A bridge module connects two processing nodes. The bridge's ports adhere to a protocol (FIG. 3) that connects multiple network nodes (within the two connected networks) at the data link layer (layer 2) of the OSI model corresponding to layers 305 and 309. In FIG. 3, the 'service layer' represents the midpoint between the two connected processing nodes. Data link layers 305 and 309 reside on top of physical layers 301 and 313 and abstract physical layers (layer 1.5) 303 and 311, respectively. Service layer 307 interprets service requests coming from UNI connections (from central packet network 111 that utilizes packet based protocol such as MIPI UniPro) or from SUB (from multi-processor subsystem).

As shown in FIG. 3 and according to an embodiment of the invention, the UNI connection presented to a device wide network is, for example, a standard UniPro2 or Spacewire connection. The physical layer is, for example, Mobile Industry Processor Interface (MIPI) MIPI M-Physical Layer (MPHY), MIPI D-Physical layer (DPHY) or Spacewire PHY 313. On the multi-processor subsystem side of the bridge module, the SUB connection corresponds to a subsystem bus or a network standard such as MIPI standard Bus (SlimBus™), I2C (Inter-Integrated Circuit) or Universal Serial Bus (USB).

A bridge module typically does not transmit accurate timing information between the UNI and SUB connections at the opposite sides of the bridge module. But the bridge module may independently generate timing to meet the bus or network requirements at both connections. The bridge module typically interprets service requests from one I/O connection (corresponding to either UNI or SUB in FIG. 3) and sends requests to the other I/O connection (corresponding to SUB or UNI in FIG. 3).

Figure 4:
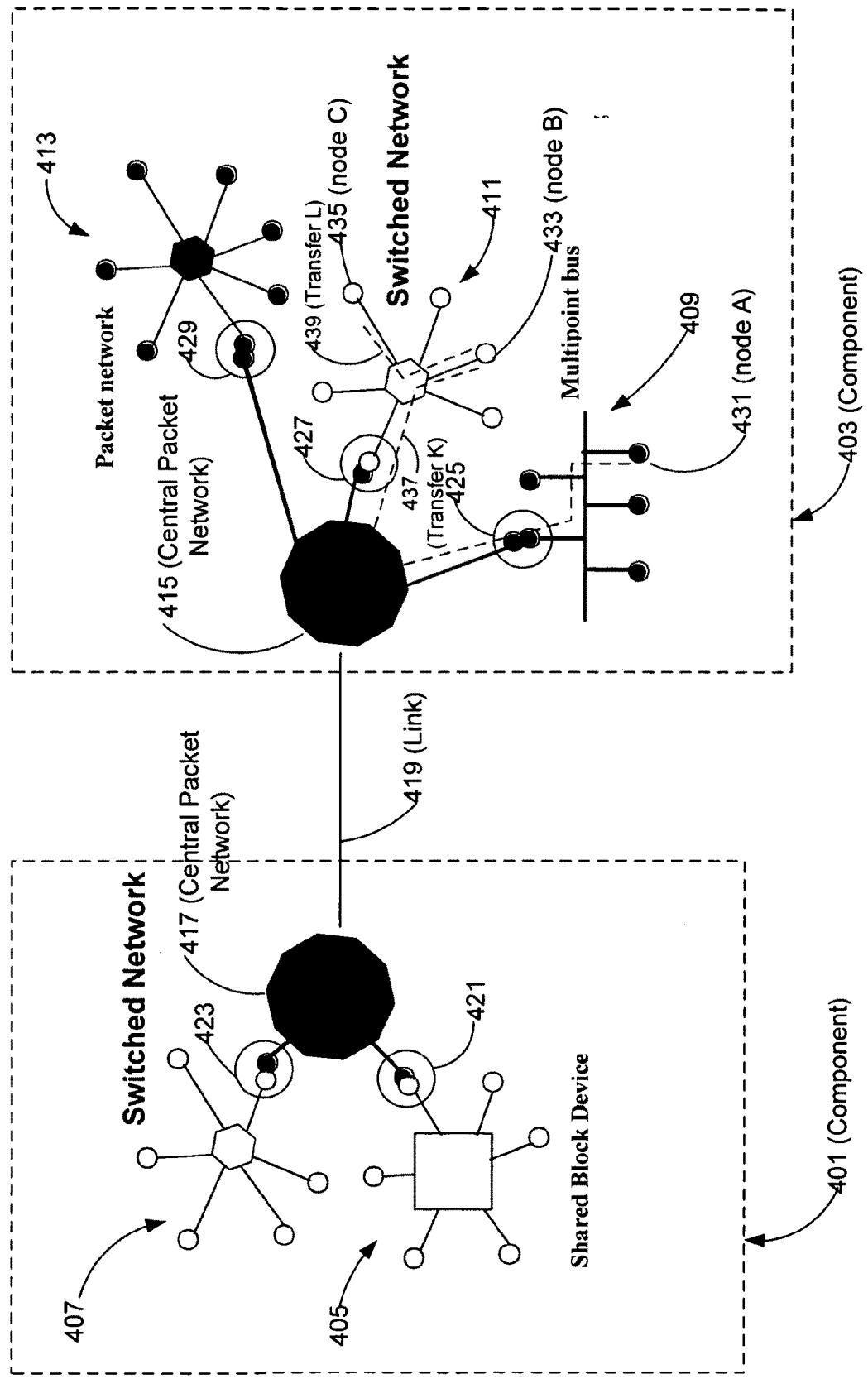
FIG. 4 shows a system composed of multiple domains each with multiple multi-processor systems that can operate independently according to an embodiment of the invention.

FIG. 4 shows components 401 and 403 of a multiple multi-processor system that can operate independently according to an embodiment of the invention. Multi-processor subsystems or groups of multi-processor subsystems may be separated into independent devices. For example, as shown in FIG. 5, one part of the device (e.g., component 401) may be taken for viewing a sport activity, while the other part (e.g., component 403) may be left at home to be loaded with movies or used as a projector for television.

In the embodiment shown in FIG. 4, component 401 includes multi-processor subsystems 405-407 that interact with each other through central packet module 417 and bridge modules 421 and 423. Component 403 includes multi-processor subsystems 409-413 that interact with each other through central packet module 415 and bridge modules 425-429. While components 401 and 403 may operate independently, components 401 and 403 may be joined through link 419 coupling central packet modules 415 and 417 so that multi-processors 405-413 interact with each other (e.g., when a recording of a sports event is played through a television at home). Link 419 may also support hot plugging functions that allow connection when one or both components are powered when physical connection is established.

Figure 5:
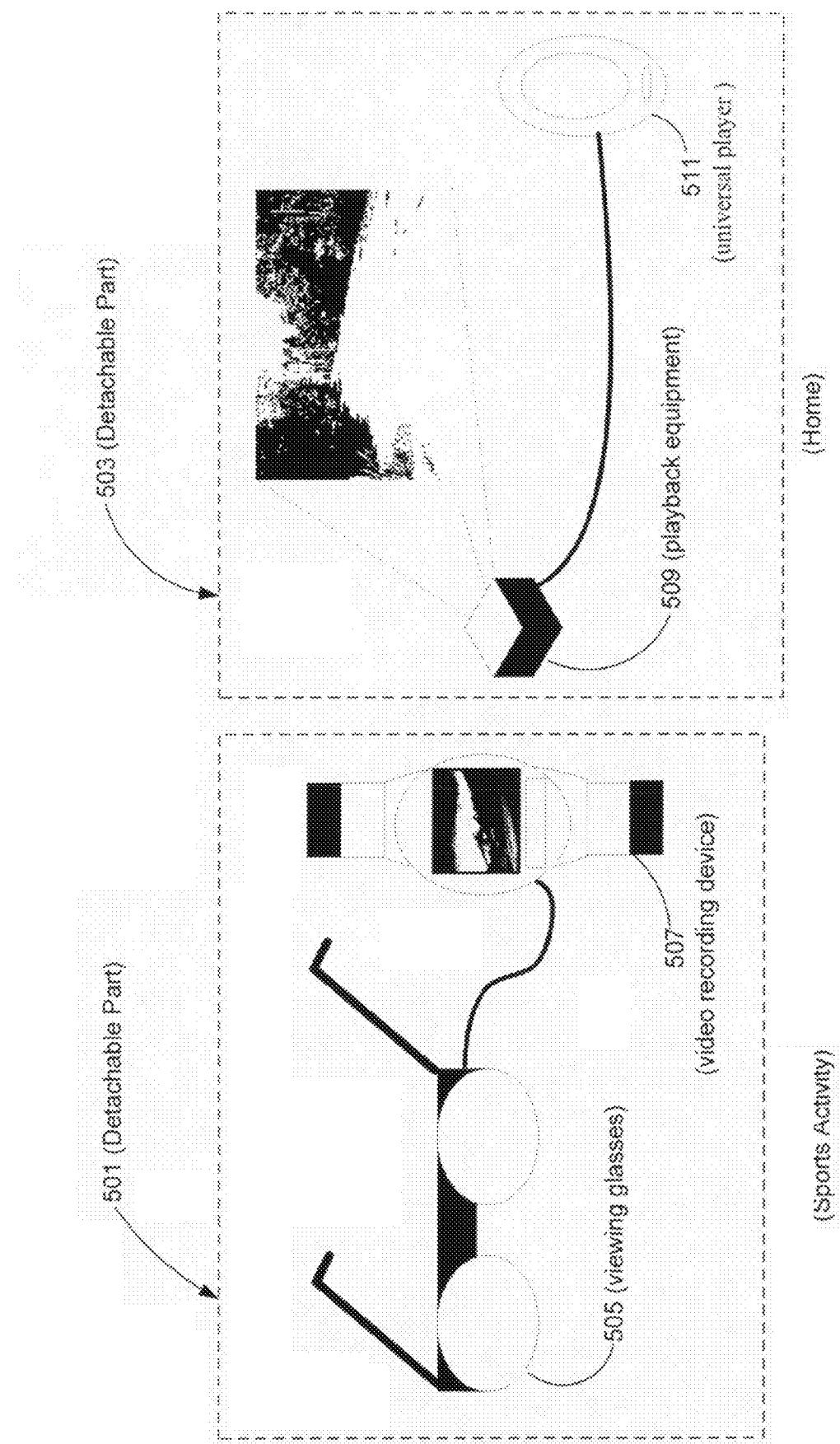
FIG. 5 shows parts of a mobile device that may function as independent devices according to an embodiment of the invention. Each part represents a domain. The Figure shows how two domains can be connected or disconnected.

FIG. 5 shows detachable parts (components) 501 and 503 of a mobile device that may function as independent devices according to an embodiment of the invention. In the exemplary embodiment, detachable parts 501 and 503 correspond to components 401 and 403 as shown in FIG. 4. Detachable part 501 (which may be taken to a sports event) comprises viewing glasses 505, which the user wears when viewing a sporting event, and video recording device 507, which records the sporting event as seen through viewing glasses 505. Detachable part 503 (which remains at home) includes playback device 509. Element 511 comprises mass memory for content to be played by projector or to store recorded video. The user can play back the sports event by coupling detachable part 501 with detachable part 503. Detachable parts 501 and 503 may be any single part or group of parts of a mobile device.

FIG. 6 shows an example of a relationship between services in two separate service domains 601 and 603 according to an embodiment of the invention. The architecture is directed towards service oriented approaches. Services (e.g., services 611-619) may be supported with several technologies such as Network on Terminal Architecture (NoTA), Universal plug-and-play (uPnP), the Internet, the operating system (OS), and any execution environment within the OS. (The OS may include several execution environments, each of them is a domain). Each technology may constitute a domain, where a service domain is a container for services that communicate using a native protocol. A domain typically represents a network but may represent any execution environment. Domains 601 and 603, corresponding to Domain I and Domain II respectively, may be connected by bridges. Domain 601 and domain 603 may have any internal structure with multiple sub-domains and may be further connected to a number of subsequent domains not shown in the FIG. 6. Similarly, modules 605 and 607 may be sub-divided and may be connected to modules not shown. Each domain represents a network or an execution environment. Modules 605 and 607 represent processing nodes (typically multiprocessor subsystems) in domain 603. FIG. 6 illustrates the connection of two domains, where the domains represents a network and an execution environment (for example, in which domain I is an OS and domain II is a NoTA platform for the OS). FIG. 6 combines two levels of abstraction: concrete elements at network or domain level (the boxes excluding the application box) with abstract elements at service level (the ellipses (services) and the application box). The arrow between elements 613 and 615 represents a data connection over a bridge (bridge not shown). The connection is from a node (the node is not shown, only the service is) in domain 601 (e.g., the execution environment represented by it) to a node 605 in domain 603. The arrow from 615 to 617 (services) represents a data connection from node 605 to node 607 within the network represented by domain 603 (thus no bridge needed). FIG. 6 also shows the service aspect: services are abstract entities executed on processing nodes. A logical communication between services is performed internally to a processing node, within a network or between networks. At a logical level (the service level), the networks or nodes are not visible.

Application 609 in domain 601 uses a number of services (e.g., 611 and 613) in the same domain. These services may use other services from any domain. Service 613 in domain 601 may thus also use service 615 in domain 603. Service 615 in turn may use other domain services in domain 603, e.g., service 617. Similarly, a service in domain 603 may thus also use services in domain 601.

In the example shown in FIG. 6, accessing a service (e.g., service 617) is a relationship common to both service domains and that access crosses domain boundaries. (Crossing domain boundaries implies using a bridge). There is a relationship between services implied by service access. Relationships fall into three categories: within domain 601, within domain 603, and inter-domain between domains 601 and 603. (A relationship may also be within a processing node, in which several services may be provided by the processing node.) Thus, it may be beneficial if the service interfaces are similar in all domains in order to make translation between the domains easier. (This translation is done by the bridge.) By similarity is meant that there exists an abstract protocol (FIG. 7) in which features are fully provided by the service interfaces (service protocols) in each domain. The abstract protocol should be sufficiently rich and implement a specified minimum of functionality. Moreover, domain 603 introduces a domain hierarchy, where module 607 and module 605 are separate service domains within the domain.

Figure 7:
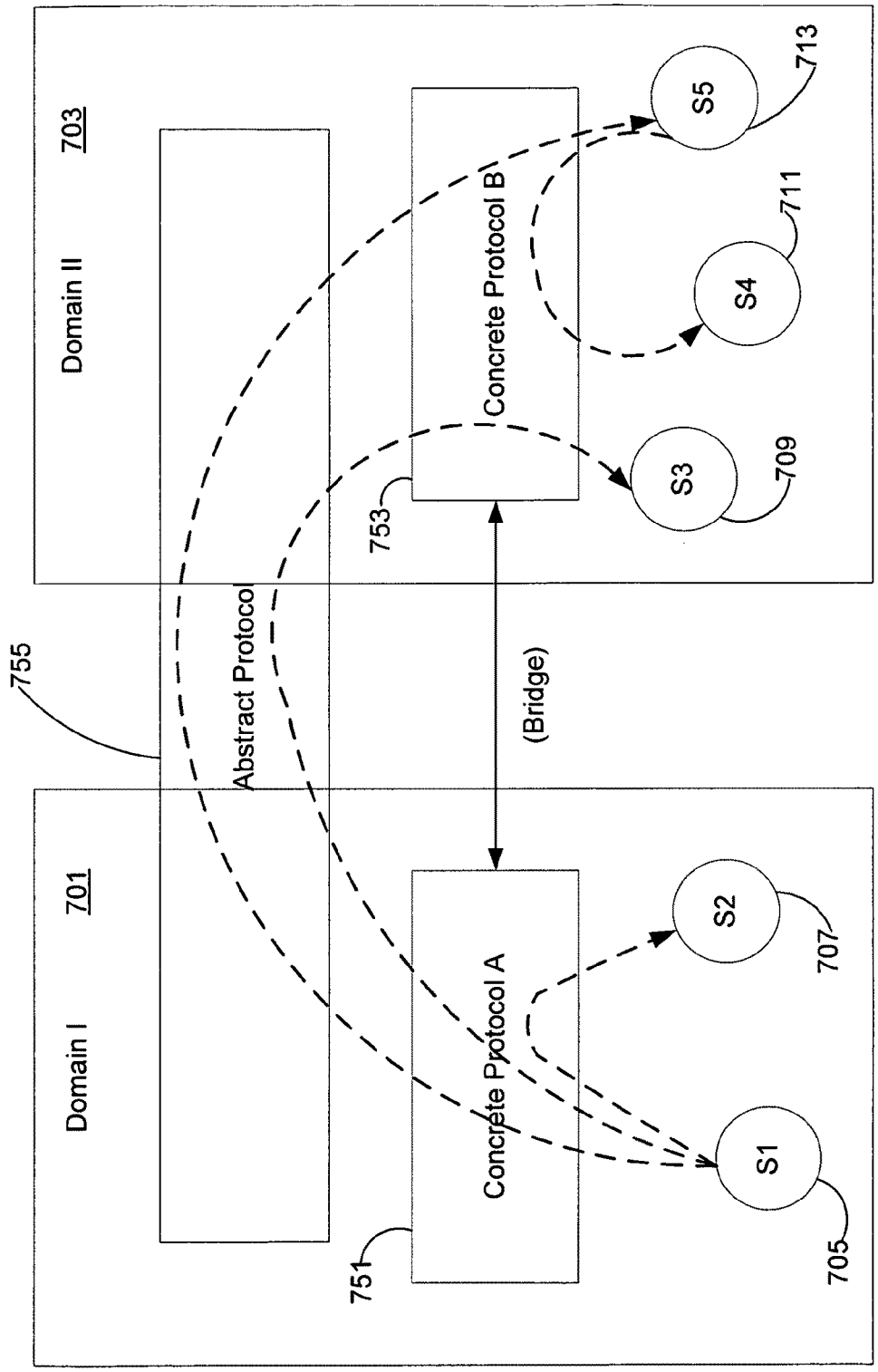
FIG. 7 shows an example of an abstract protocol.

FIG. 7 shows an example of abstract protocol 755 that generalizes concrete domain specific protocols 751 and 753 and its relationship to concrete protocols in two domains 701 and 703 according to an embodiment of the invention. A domain (e.g., domains 701 and 703) is a network including the multiprocessor subsystems (e.g. processing nodes) that belong to it. A domain is a continuous area that is not interrupted by a bridge. A network may contain a plurality of multiprocessor subsystems or only one multiprocessor subsystem. When communication between services 705-713 over two or several different domains (e.g., domains 701 and 703) occur, one may define a universal protocol translation which is common to all domains. The universal protocol is layered so that each domain 701 and 703 has its own concrete consolidation of the abstract protocol 755. Abstract protocol 755 provides a uniform programming environment for all domains (e.g., 701 and 703). Any of the concrete protocols 751 and 753 may be mapped onto abstract protocol 755, but typically only partly. Abstract protocol 755 can be mapped fully onto any concrete protocol. Translation happens so that concrete protocol 751 or 753 is mapped onto abstract protocol 755 (which easily can be mapped onto another concrete protocol). Features and portions of concrete protocol 751 or 753 that cannot be mapped onto abstract protocol 755 are translated in the bridge by an algorithm which is specific to the concrete protocol 751,753 pair used. This approach minimizes the specific algorithm since abstract protocol 755 can be mapped with a more generic algorithm.

Abstract protocol 755 is a minimalistic description of common aspects of concrete protocols 751 and 753 so that abstract protocol 755 defines mappings between the features of concrete protocols 751 and 753 over the domain boundary.

This facilitates a concrete translation between concrete protocols 751 and 753 when implemented with a bridge.

The destination of the message is determined by the sender. It may be in the same domain or in a domain reachable (on a path from) from the sender's domain. Domains may be defined by on-chip networks or any other technology that implies architecture such as uPnP or OS solution. (In the above discussion, the terms domain and network are interchangeable. (In this discussion a network implies a domain.) However, an OS based domain may not be considered as a network. Thus in this context 'all domains' is a superset of 'all networks'.) An OS may implement several domains. In that context domains are execution environments within an OS. Each execution environment contains at least one virtual processing node. (Typically there is only one virtual processing node. The virtual processing node is defined only to make execution environment based domains architecturally identical to network based domains.) Each node may provide several services. Examples of systems that may be used as OS domains are application servers, content management systems, the Java VM, and the .NET framework protocol. An example of a structure that may be used as a processing node is a single software application. (Typically the virtual processing node is the execution environment itself e.g., Java VM or Python VM.) The whole OS and its default execution environment would be the typical OS based domain, i.e. the OS as a domain provides several services. Services communicate using messages. Each message includes:

1) Name—Identifies the message and provides indirectly a description of the purpose (role) of the message
2) Address—defines the recipient, a path to it can be derived from the address
3) Body—The Body contains data in a format defined by the role
   The concepts of 'Name' and 'Address' are generic and may include several fields of information. The body may also consist of several packets or blocks depending on the medium (network) used to transfer the message.

There can be two types of messages depending on the type of message body:
1) Finite length blocks
2) Data streams Messages passed to or from services can be assigned a number of roles. The role is defined by naming the message. The following message roles may be provided:
1) Named data block or stream (As an example, input and output may be messages with the name 'input' and 'output'. A typical use is that the roles of these two are predefined)
2) Method call (a method is invoked by a message with the methods name)
3) Method reply (a message with the methods name altered to indicate its a reply)

A service may accept or expect a number of named messages, depending on the current state of the service. Messages are identified by their name only. As an example, a decoder may expect an input stream. The stream is identified by its name that may be, for example, input or mpeg_stream. With another example, a service accepts configuration parameters in a block message named configuration. (A 'name' is a concept that's broadly defined. The name may include several data fields used to identify a message.)

When the name of a message that is received by a service is the name of the method, the method is executed by the service. The message contains parameters as needed. If the method generates a reply, a named message is sent with the method's name altered to indicate it is a reply.

Some method calls and method replies can be predefined. In addition to predefined methods, a generic method can support any custom functionality of the service (e.g., services 611-617 as shown in FIG. 6):
   Generic method call and reply
   Predefined methods
   1) Diversion (instructs the service to divert all messages with a given name to another service—i.e., pass the message on to another service)
   2) Alias (instructs the service to rename an incoming or outgoing message)
   3) Query and Info (a query lists methods and/or named messages provided by the service. An info query requests a description of a specified method or named message, its type, purpose, format and parameters)

There are two types of data: streams and blocks. These are transferred in the body part of messages. The streams are a contiguous stream of bytes or bits. Parameters may for instance include bit rate and quality of service (QoS). Blocks are finite length data that are not accessible without the whole piece of data being transferred. Parameters may, for instance, include data size and transfer priority.

Some message names may be predefined. The message names in the following list are exemplary and should be seen as a way to clarify the concept of data messages and their naming.
   Generic Data
   predefined Data
   1) Input
   2) Output
   3) Configure When a service receives a message, its semantic meaning and its context is derived from the message name. The message's name has a meaning to the receiving service, and if not, the message is discarded. Referring to FIG. 4, an activating service on the processing node 413 may send a message to a service on one of the nodes in domain 405. For example, the message is named 'Query' and is passed to the routing algorithm that sends it from node 413, via the network to bridge 429, via the network 415 and via the network 417, over the bridge 421, via the network 405 to the right node where the receiving service resides. The query is processed and a reply message with a name derived from 'Query' is passed back to the activating service via network 405, over the bridge 421, via the network 417 and via the network 415, over the bridge 429, via the network to node 413 where the activating service resides.

The message's address determines the recipient. Addressing may imply procedures to resolve message paths or any domain specific issues in the concrete protocol, but the abstract protocol refers to addressing only by the abstract name of the recipient service.

Figure 8:
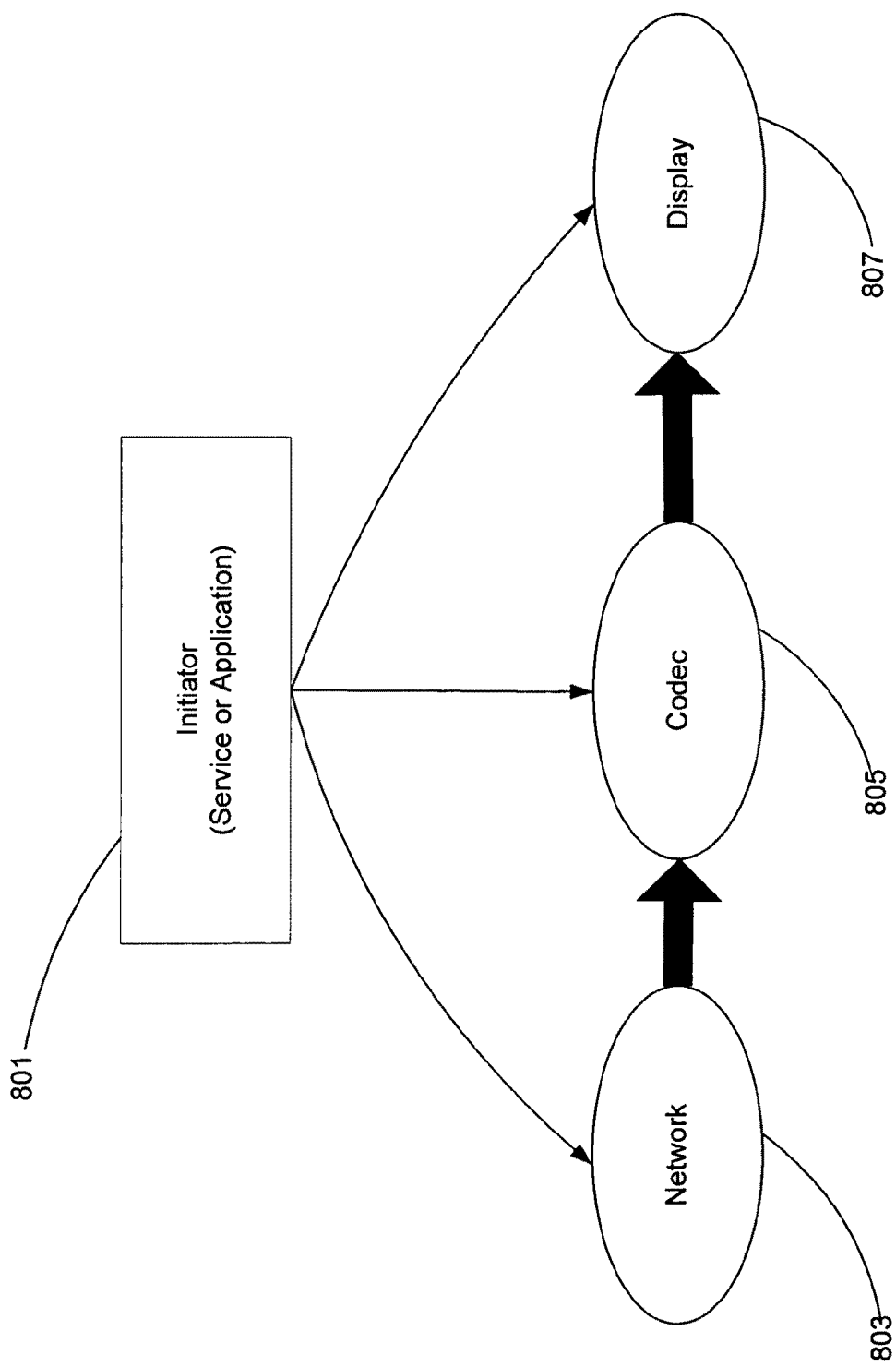
FIG. 8 shows an example of data streams being diverted by an initiator according to an embodiment of the invention.

FIG. 8 shows an example of data streams being diverted by initiator 801 according to an embodiment of the invention. A service that acts as an agent in initializing other services is an initiator service. In the embodiment shown in FIG. 8, initiator service 801 diverts data streams or blocks (for example, raw video data) from the network service 803 through codec service 805 to display service 807 processed by the services 803, 805 and 807 rather than processed as a read write transfer sequence done by the initiator. As an example, referring to FIG. 4, consider a service on node A 431 on domain 409 and services on nodes B 433 and C 435 on domain 411. Also an initiator service J (not shown) is provided on one of the nodes on domain 413. Using diversion J, one can instruct A, B and C to create two data transfers: Transfer K 437 from A to B and transfer L 439 from B to C. The path of K is from node A on domain 409, using the multipoint bus 409, over bridge 425, via network 415, over the bridge 427, via network 411 to node B. The path of L is from node B, via the network 411 to node C. Initiator service J is not involved in passing the data between the nodes, it only instructs other elements (nodes A, B and C) to perform the task. That is done using three messages (not shown) from J to A, B and C respectively. (A diversion message can also be used delete a previously configured task).

For performance considerations, services in the hardware platform domain send data directly to each other rather than via an initiator service.

A service may have a default destination for any message with a given name. For instance, the reply generated by a method can be sent to the service that triggered the method. There may also be other default message destinations. An output message may have a predefined destination. For instance, raw video data may by default be sent to the display service.

If it is desirable to send a particular message to a given service, a service may be instructed to do so with a diversion message. The diversion message is identified by its name, where the diversion parameters are contained in the body. Diversion parameters include name and address, where the message name refers to the messages that shall be diverted by the service that receives the diversion message. The address refers to the address the messages shall be diverted to. As example of a diversion message: Message Name is 'Diversion', Parameters are message='XDATA' and destination='Yserver'. The message is sent to the service 'TEST'. As a result the service 'TEST' will divert all its messages with the name 'XDATA' to the service 'Yserver'.

The service receiving the diversion command may send any message with a specified name to a given service, as defined in the command. The diversion command may be revoked by sending a new diversion command with a null address for the recipient or by sending an empty diversion command.

A service may be instructed to rename a message with a specified name to a given new name. This is done with a message named alias. Such renaming is reset by sending an empty alias message (will reset all aliasing for the receiving service) or by defining the new name to null. An example of an alias message is as follows: Message name is 'Alias' parameters are original='EndlessStream' alias='Waterfall' direction='incoming'. The message will cause the receiving service to rename all incoming messages called 'EndlessStream' to 'Waterfall'. (With embodiments of the invention, both incoming messages and outgoing messages may be renamed.)

Methods and named data messages must be known to other services in order to be used. Some methods and data messages may be predefined as mentioned above. Data messages such as input and output may be predefined. However, to bring clarity to message naming, all naming definitions may be queried from a service.

A message named query returns a list of all named methods, all data expected, and all data potentially generated by the service. Note that this list is a function of the state of the service and may change with time.

If any further description of a specified name is required, a query message is sent with the data or method signal followed by the name of the requested entity. This executes the query method with the info parameter set and returns a description of the named message or method.

Figure 9:
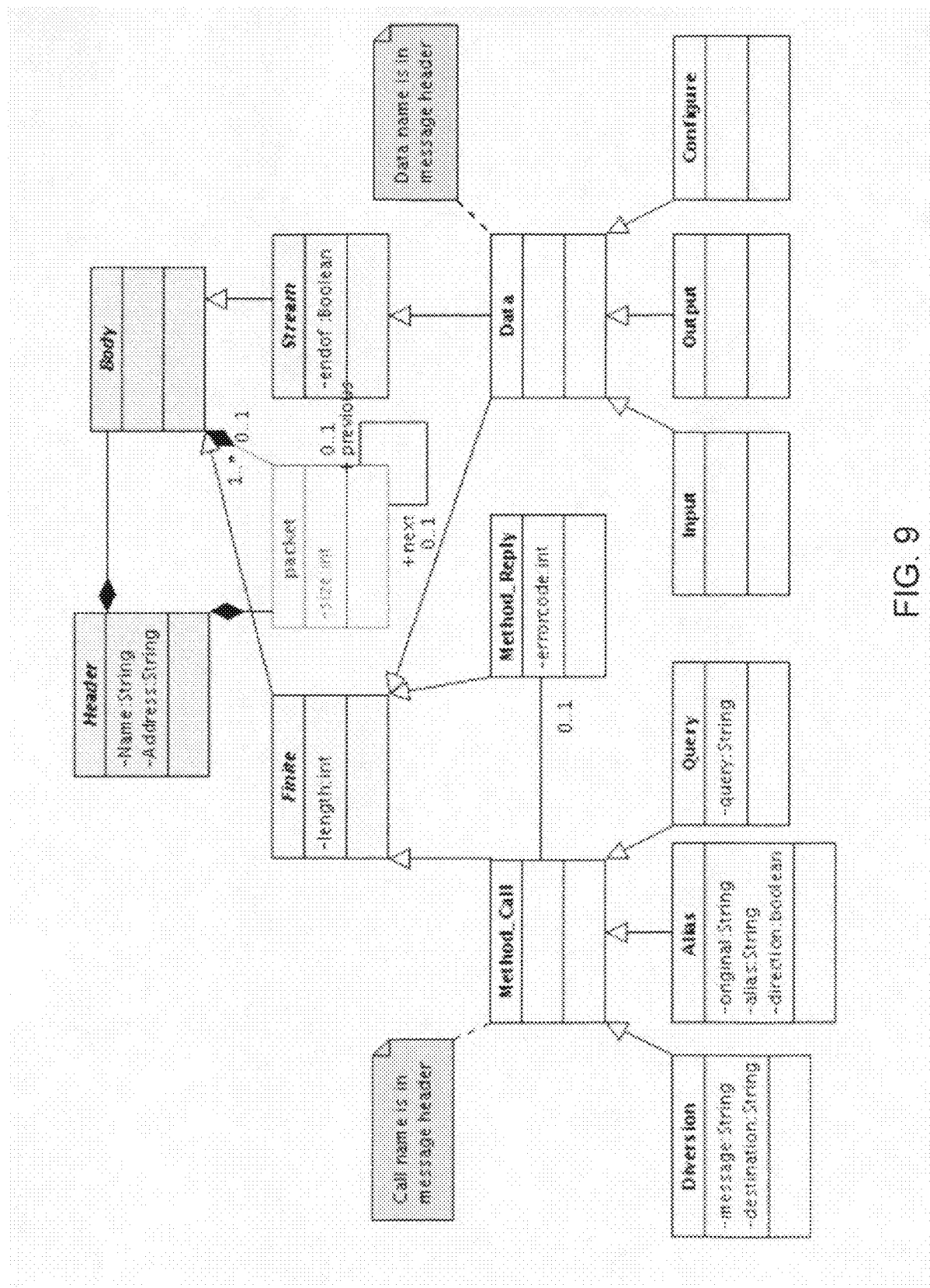
FIG. 9 shows a representation of an object hierarchy of the common service interface messages in accordance with an embodiment of the invention.

FIG. 9 shows a representation of an object hierarchy of the common service interface messages in accordance with an embodiment of the invention. Each message has a header and a body. The graph assumes a packet based messaging protocol, but the same concepts can be applied to different messaging platforms.

Figure 10:
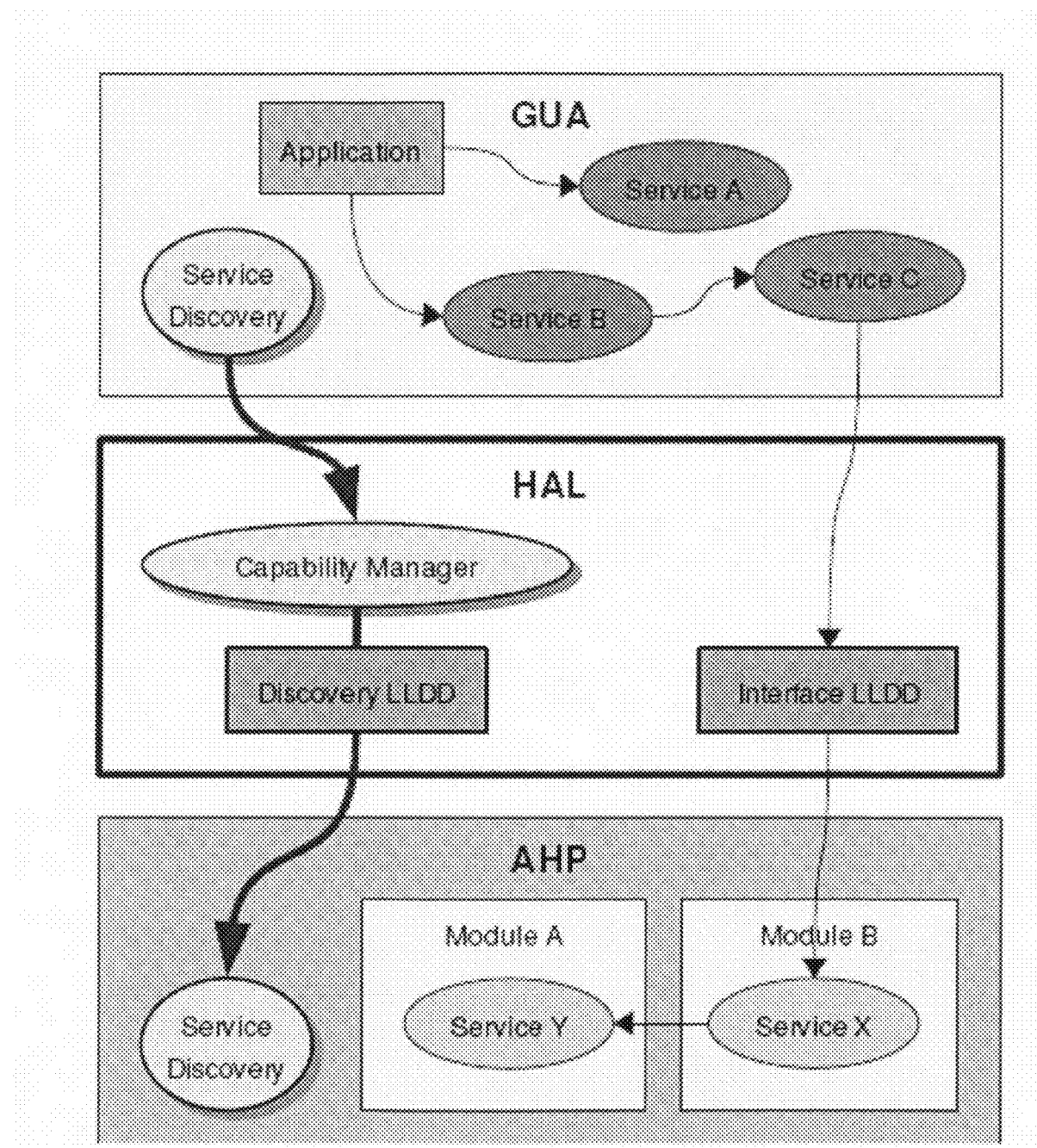
FIG. 10 shows relationships between a grand unified architecture (GUA) and an abstracted hardware platform (AHP) domain translated by a hardware abstraction layer (HAL) according to an embodiment of the invention.

FIG. 10 shows relationships between a grand unified architecture (GUA) and an abstracted hardware platform (AHP) domain translated by a hardware abstraction layer (HAL) according to an embodiment of the invention. A capability manager declares hardware capabilities to a grand unified architecture (GUA) based on common interface messaging data structures having a number of classes that describe hardware entities and their capabilities. With a service oriented architecture system hardware, functionality is presented as services. The data structures have provisions for services.

When two domains in a service oriented architecture communicate using the common service interface, a bridge translates the concrete protocols. The bridge translates between the AHP and GUA. GUA accesses services in the AHP. It is possible to access services in GUA from the AHP.

Each service may have features that are not covered by the common service interface. The common service interface implies only a generic way to pipe data and a way to trigger methods. When a service is found, a service discovery mechanism conveys the information of how the service is used. For instance by naming the interface standard used by the service.

The HAL layer acts as a bridge between the service domains. The GUA capability manager may implement the bridge within the HAL layer so that service calls are mapped to a native GUA service architecture via the common service interface.

With embodiments of the invention, a capability manager may support the following capabilities:

Reading and writing data is replaced by service calls.

Event subscription is provided by the capability manager in a similar way as in a conventional hardware environment.

Virtual data loses its significance. The role of virtual data is to abstract the AHP if possible to a hardware ambiguous level.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. An apparatus comprising:
   a first processing node in a first domain, the first domain corresponding to a first set of performance characteristics;
   a second processing node in a second domain, the second domain corresponding to a second set of performance characteristics, the second set differing from the first set by at least one performance characteristic;
   a communication network configured to transport a first packet from the first processing node, through a first bridge module, to the second processing node through a second bridge module and to transport a second packet from the second processing node, through the second bridge module, to the first processing network through the first bridge module;

the first bridge module connecting the first processing node with the communication network and configured to translate packets between the first processing node and the communication network using an abstract protocol that is common to the first domain and the second domain, the abstract protocol defining a mapping between a first concrete protocol of the first domain and a second concrete protocol of the second domain; and the second bridge module connecting the second processing node with the communication network and configured to translate packets between the second processing node and the communication network using the abstract protocol.

2. The apparatus of claim 1, wherein the first processing node comprises a multi-point bus connecting each of a plurality of processors of the first processing node.

3. The apparatus of claim 1, wherein the first processing node comprises a circuit-switched network for communicating between a plurality of processors of the first processing node.

4. The apparatus of claim 1, wherein the first processing node comprises a packet-switched network for communicating between a plurality of processors of the first processing node.

5. The apparatus of claim 1, wherein the first processing node comprises a shared block device, the shared block device utilized by a plurality of processors of the first processing node.

6. The apparatus of claim 1, further comprising:
a third processing node corresponding to a third set of performance characteristics, the third set differing from the first set and the second set by at least one performance characteristic.

7. The apparatus of claim 1, wherein the first processing node supports a first service utilizing a second service, the second service supported by the second processing node.

8. The apparatus of claim 1, wherein the first processing node supports a first service and a second service and wherein the first service utilizes the second service.

9. The apparatus of claim 1, further comprising:
a third bridge module connecting the first processing node with the second processing node.

10. The apparatus of claim 1, wherein the communication network comprises a central packet network.

11. The apparatus of claim 1, further comprising a third processing node corresponding to the first set of performance characteristics.

12. The apparatus of claim 1, wherein the first processing node is configured to optimize performance of a first type and wherein the second processing node is configured to optimize performance of a second type.

13. The apparatus of claim 1 wherein the first set of performance characteristics relate to latency and the second set of performance characteristics relate to bandwidth.

14. A method comprising:
partitioning an apparatus into a first processing node and a second processing node, the first processing node in a first domain and the second processing node in a second domain, and the first domain having a different performance characteristic than the second domain;
translating a first network protocol using an abstract protocol that is common to the first domain and the second domain and forwarding a first packet, by a first bridge module, between a communication network and the first processing node;
translating a second network protocol using the abstract protocol and forwarding a second packet, by a second bridge module, between the communication network and the second processing node, the abstract protocol defining a mapping between the first network protocol of the first domain and the second network protocol of the second domain; and
transporting, by the communication network, the first and second packets between the first processing node and the second processing node.

15. The method of claim 14, wherein the different performance characteristic corresponds to a latency time.

16. The method of claim 14, wherein the different performance characteristic corresponds to a processing bandwidth.

17. The method of claim 14, further comprising: sending a message from a first service to a second service via one or more packets, wherein the first service is supported by the first processing node and the second service is supported by the second processing node.

18. The method of claim 14, further comprising:
incorporating another processing node into the apparatus, the other processing node having at least one performance characteristic that is different from performance characteristics of the first processing node and the second processing node.

19. The method of claim 14, further comprising:
separating the first processing node from the second processing node such that they operate independently.

20. The method of claim 19, further comprising:
rejoining the first processing node with the second processing node.

21. The method of claim 14, further comprising:
collecting a first set of functions that are characterized by performance of a first type into the first processing node; and
collecting a second set of functions that are characterized by performance of a second type into the second processing node.

22. An apparatus comprising:
a first component including:
a first processing node and a second processing node, the first processing node in a first domain and the second processing node in a second domain, and the first domain having a different performance characteristic than the second domain;
a first bridge module connecting the first processing node with a first communication network and a second bridge module connecting the second processing node with the first communication network and configured to translate a first packet using an abstract protocol that is common to the first domain and the second domain, the abstract protocol defining a mapping between a first concrete protocol of the first domain and a second concrete protocol of the second domain; and
the communication network configured to transport the translated first packet between the first processing node and the second processing node through the first bridge module and the second bridge module; and
a second component, wherein the first component and the second component are configurable to operate as independent devices and to be coupled with each other.

23. The apparatus of claim 22, the second component including:

a third processing node;
a third bridge module connecting the third processing node with
a second communication network; and
the second communication network configured to transport a second packet between the third processing node and the first component.

24. The apparatus of claim 23, wherein the first communication network and the second communication network are coupled in order for the first component and the second component to interact.

25. A non-transitory computer-readable medium storing computer executable instructions configured to, when executed, cause an apparatus to at least perform:
translate a first packet using an abstract protocol that is common to a first domain and a second domain and forwarding the first packet, by a first bridge module, between a communication network and a first processing node, the abstract protocol defining a mapping between a first concrete protocol of the first domain and a second concrete protocol of the second domain;
translate a second packet using the abstract protocol and forwarding the second packet, by a second bridge module, between the communication network and a second processing node; and
transport, by the communication network, the first and second packets between the first processing node and the second processing node, wherein the first processing node is in the first domain and the second processing node is in the second domain, and the first domain and second domain have a different performance characteristic.

26. The non-transitory computer-readable medium of claim 25, further storing computer executable instructions configured to, when executed, cause the apparatus to perform: send a message from a first service to a second service via one or more packets, wherein the first service is supported by the first processing node and the second service is supported by the second processing node.

27. The non-transitory computer-readable medium of claim 25, further storing computer executable instructions configured to, when executed, cause the apparatus to perform: send a message from a first service to a second service via one or more packets, wherein the first service and second service are supported by the first processing node.

28. The apparatus of claim 12, wherein the first type corresponds to high bandwidth between functions and the second type corresponds to low bandwidth between functions.

* * * * *